Dec. 30, 1930.  J. M. McCLATCHIE  1,787,050
MACHINE FOR CLOSING AND SEALING CANS
Filed July 13, 1929  10 Sheets-Sheet 1

INVENTOR
John M. McClatchie
BY Archibald Cox
ATTORNEY

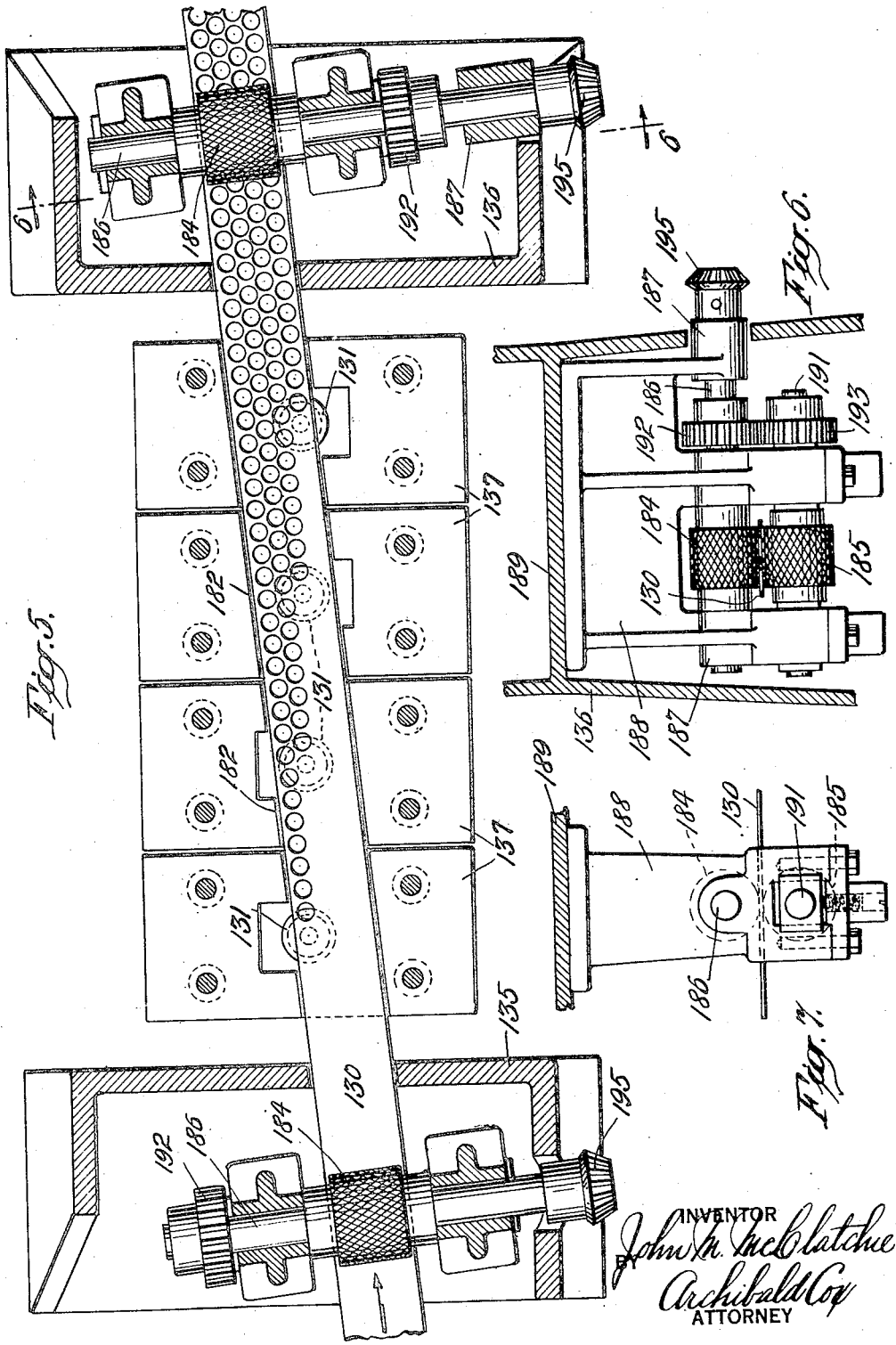

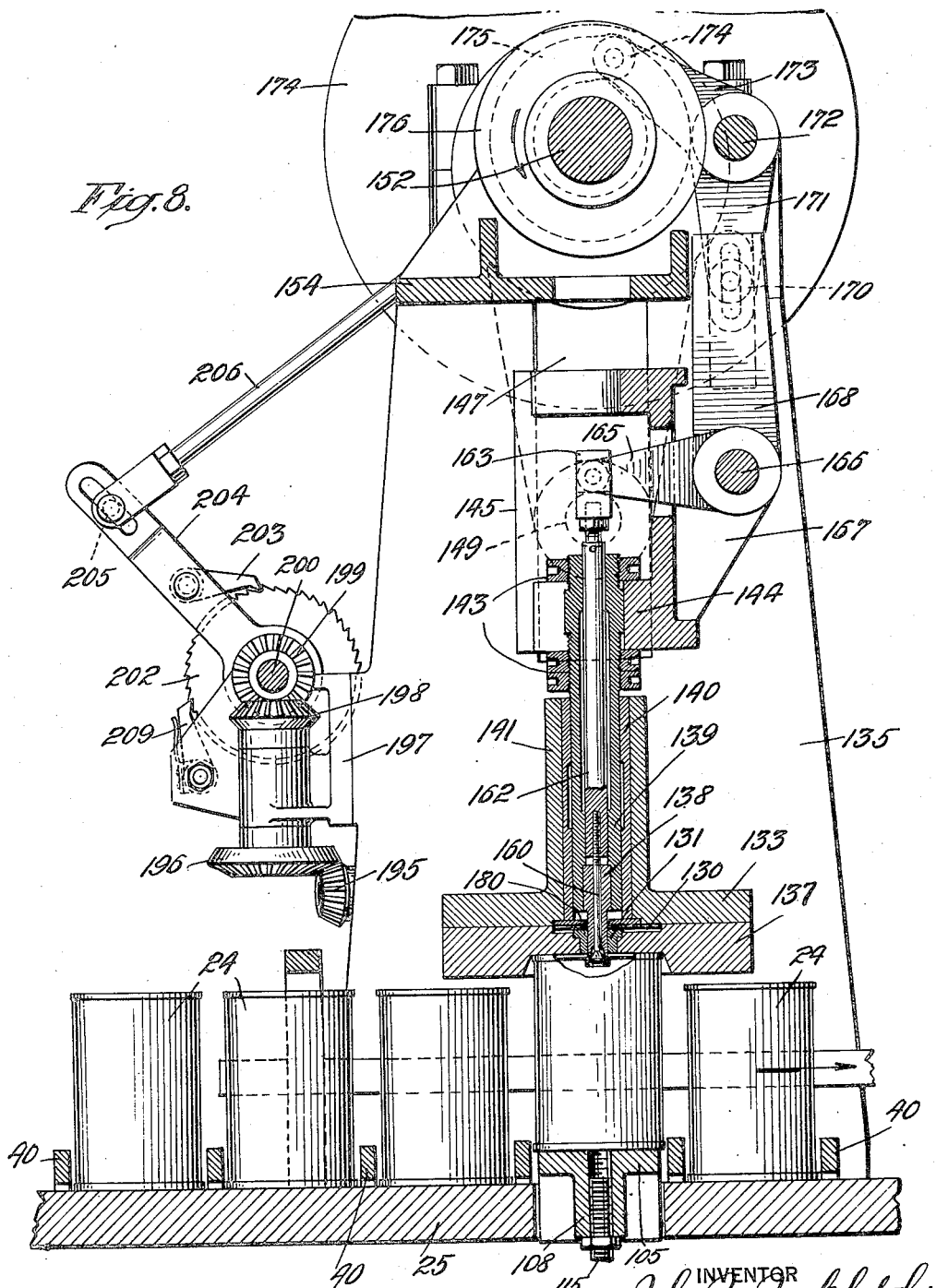

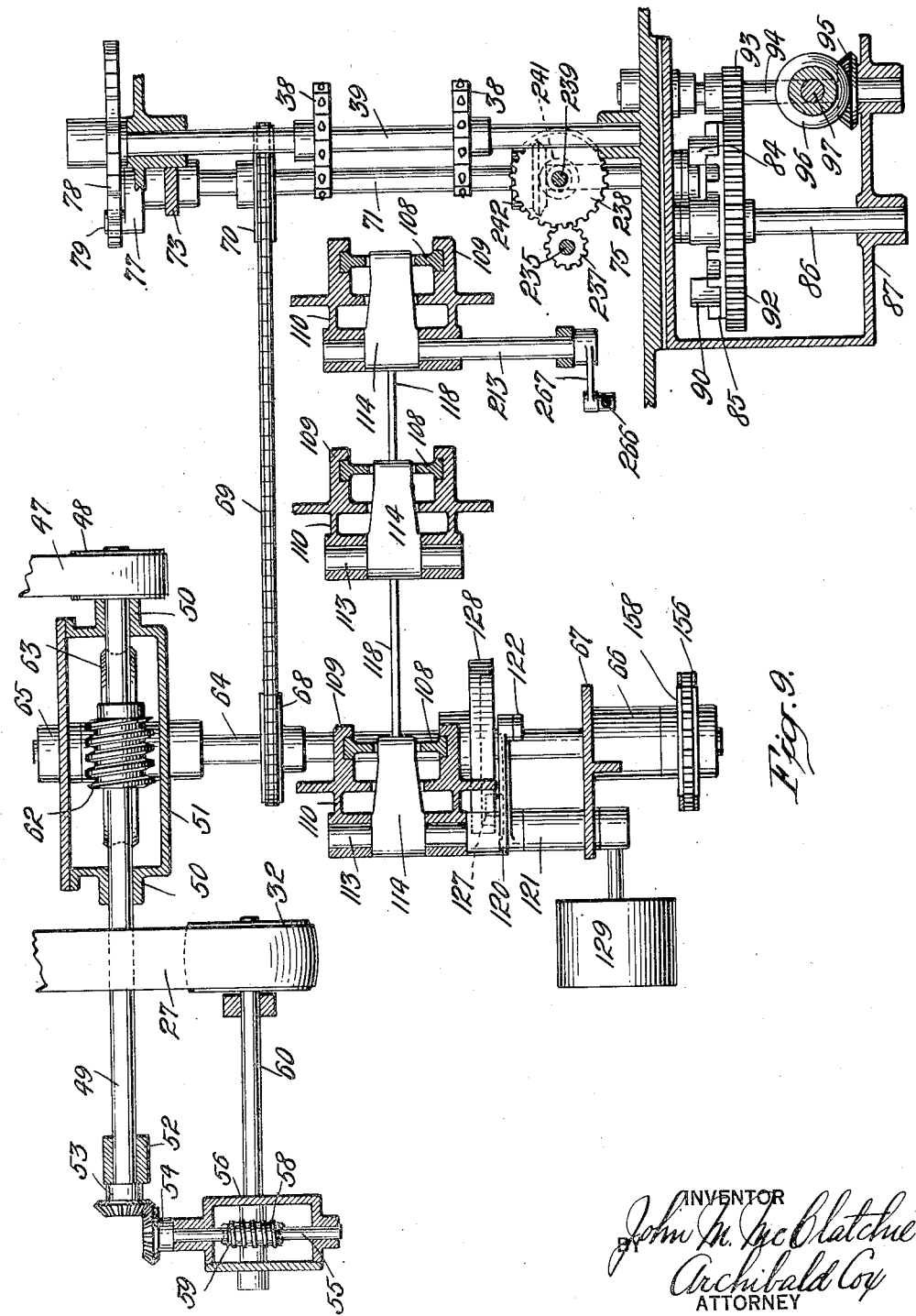

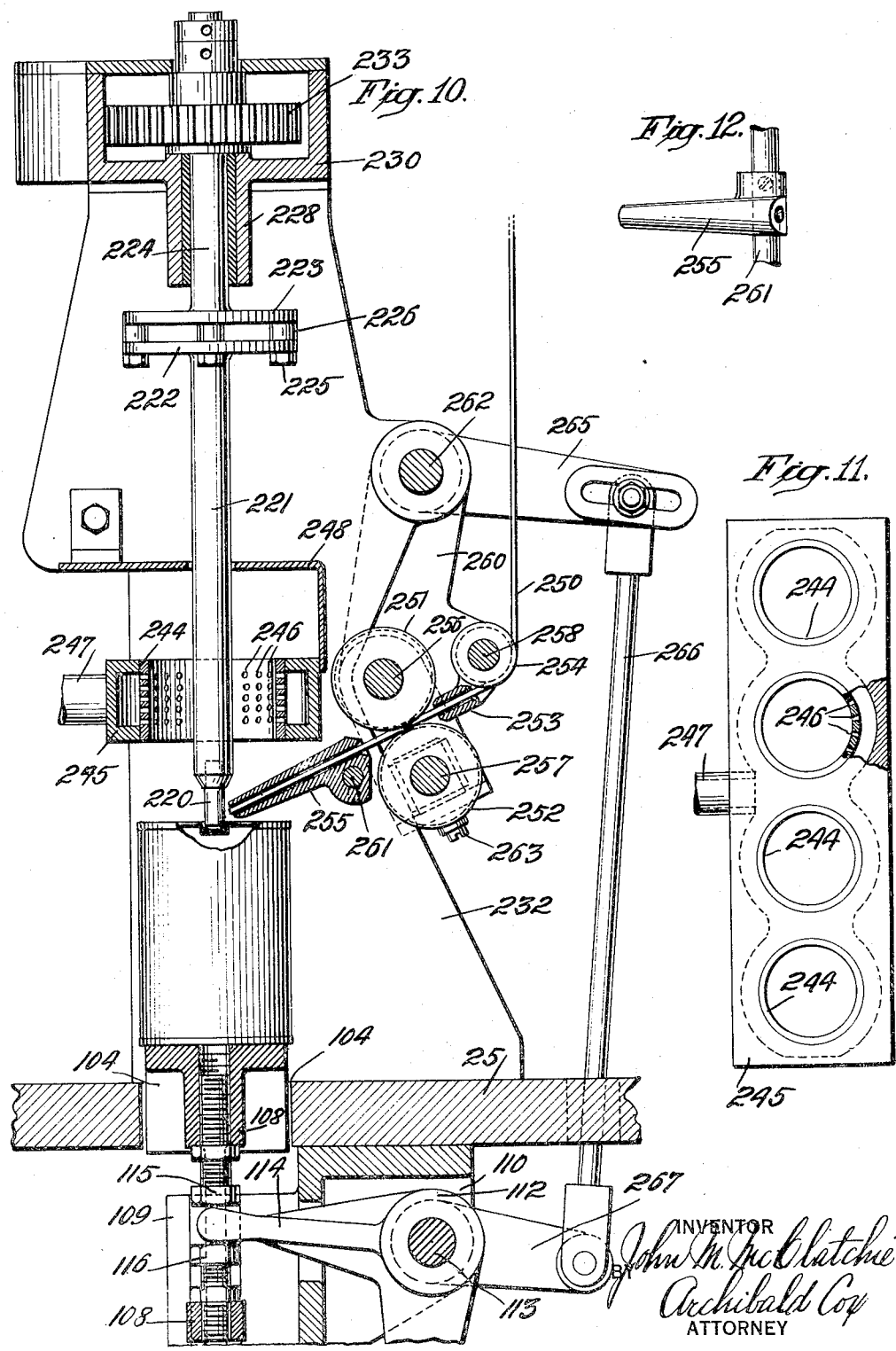

Dec. 30, 1930.  J. M. McCLATCHIE  1,787,050
MACHINE FOR CLOSING AND SEALING CANS
Filed July 13, 1929    10 Sheets-Sheet 9

INVENTOR
John M. McClatchie
BY Archibald Cox
ATTORNEY

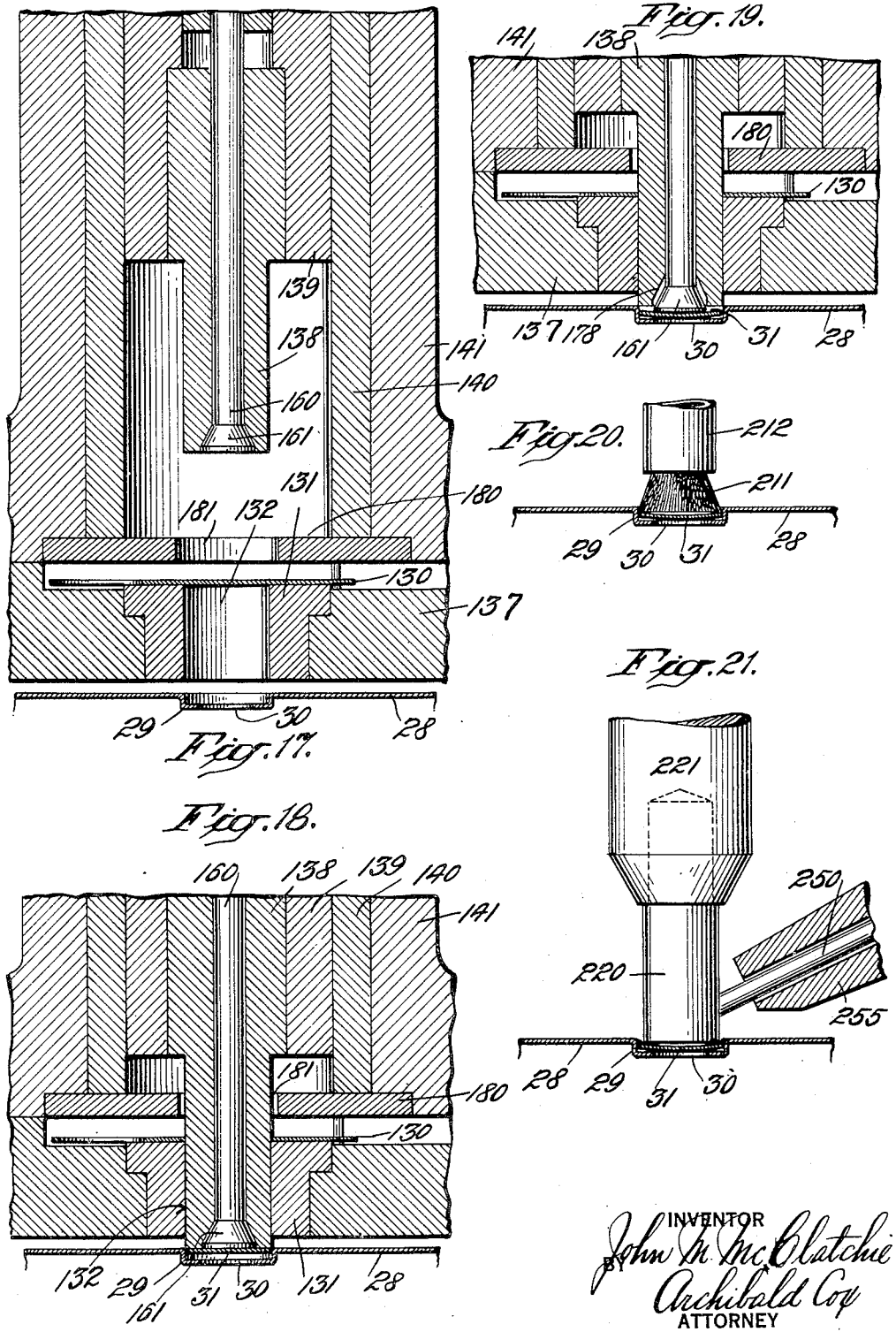

Patented Dec. 30, 1930

1,787,050

UNITED STATES PATENT OFFICE

JOHN M. McCLATCHIE, OF NEW YORK, N. Y., ASSIGNOR TO THE BORDEN COMPANY, OF NEW YORK, N. Y., A CORPORATION OF NEW JERSEY

MACHINE FOR CLOSING AND SEALING CANS

Application filed July 13, 1929. Serial No. 377,974.

The invention relates to an improvement in machines for closing and sealing cans, and more particularly to an improvement in machines for closing and sealing the relatively small central aperture in the top ends of the cylindrical tin cans used for containing evaporated milk.

The object of the invention is to produce a machine by which the closing and sealing of cans such as those commonly employed for containing evaporated milk can be more expeditiously and efficiently closed and sealed than by the machines heretofore produced for this purpose. One feature of the present invention provides the devices by which the apertures in the cans are closed according to the method set forth in my copending application Serial No. 297,330, filed August 3, 1928. According to the method disclosed in said application a filled can is held in upright position, a sheet of metal is supported above the can and a punch with its cooperating die is operated to cut out a cap or disk from the metal and insert it immediately into the aperture of the can, thereby closing the can. Other features of the present invention provide means for applying flux to the joint between the cap or disk and the edges of the aperture and then soldering the joint to hermetically seal the can. And further features of the invention deal with the means by which these various operations are performed simultaneously on a plurality of cans. The invention is more fully described hereinafter and is particularly pointed out in the appended claims.

Figure 1:
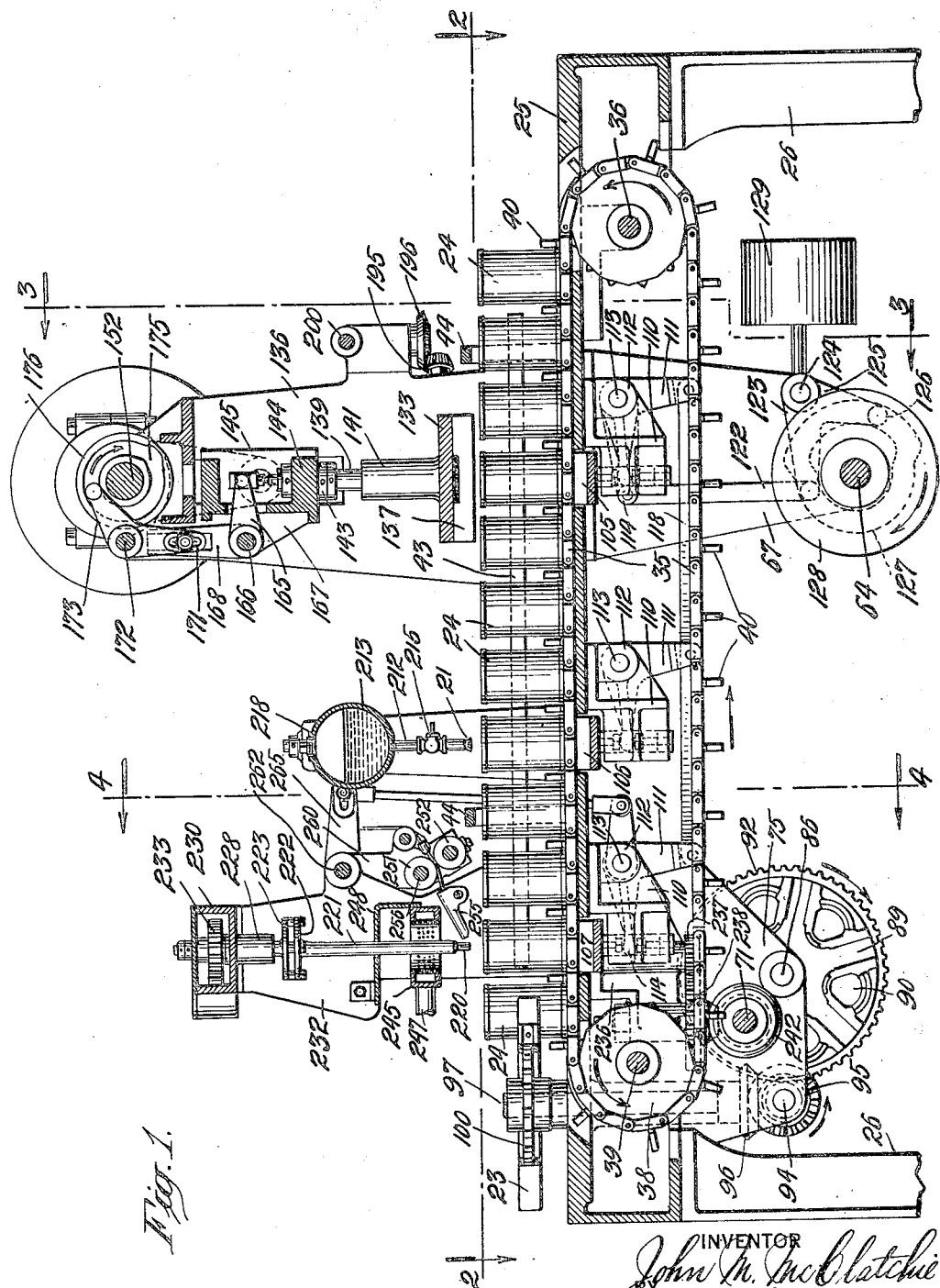
Figure 2:
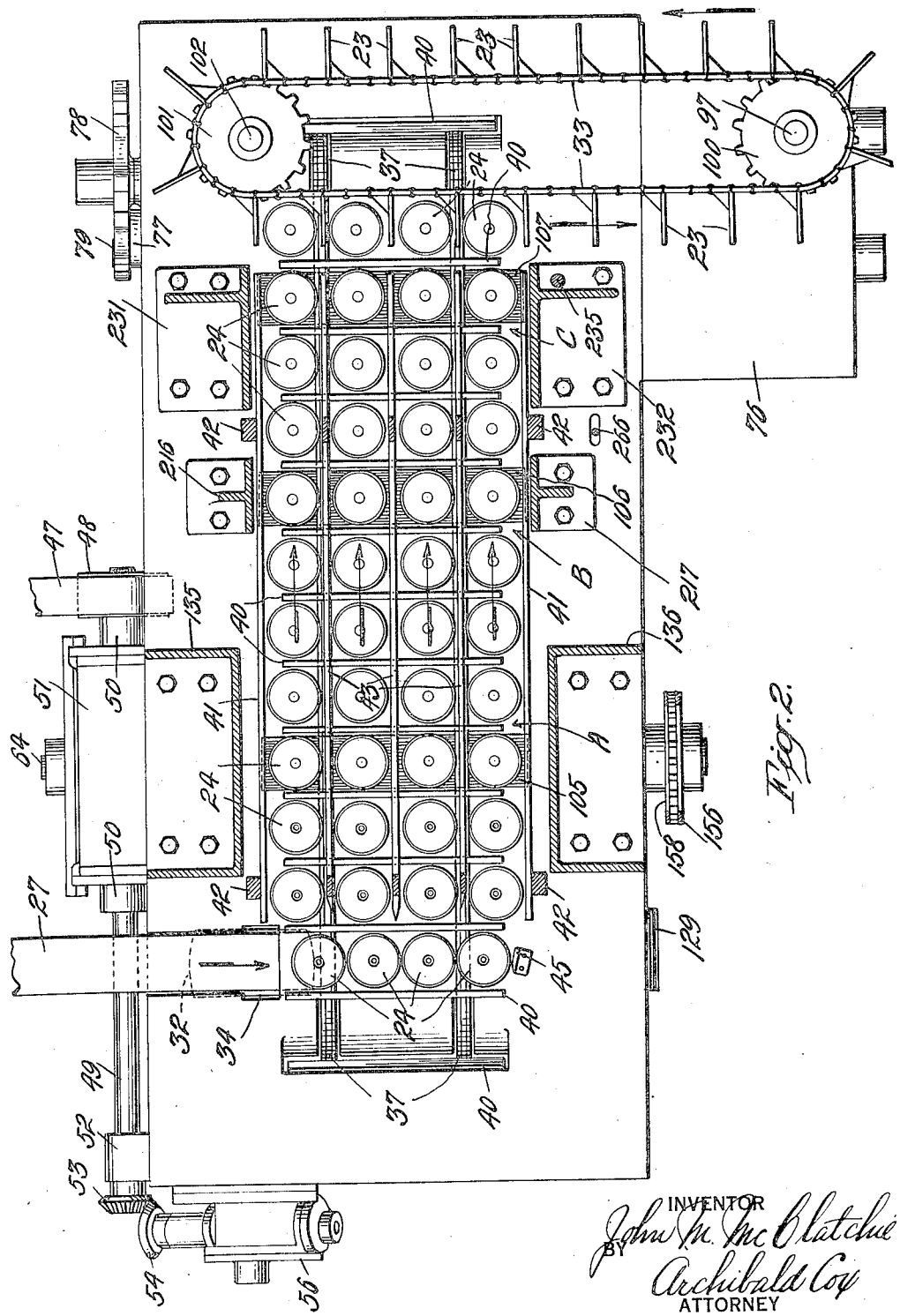
Figure 3:
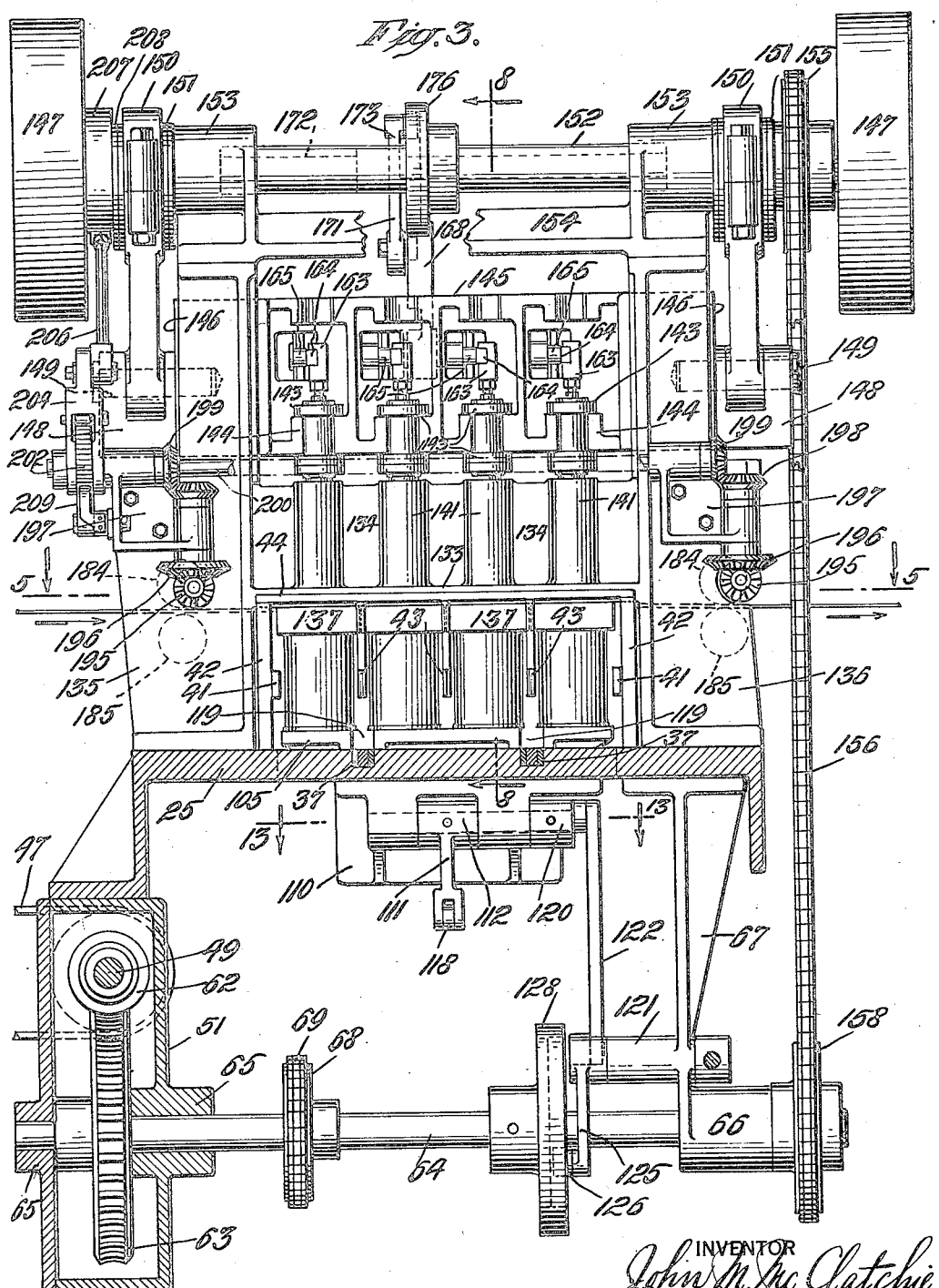
Figure 4:
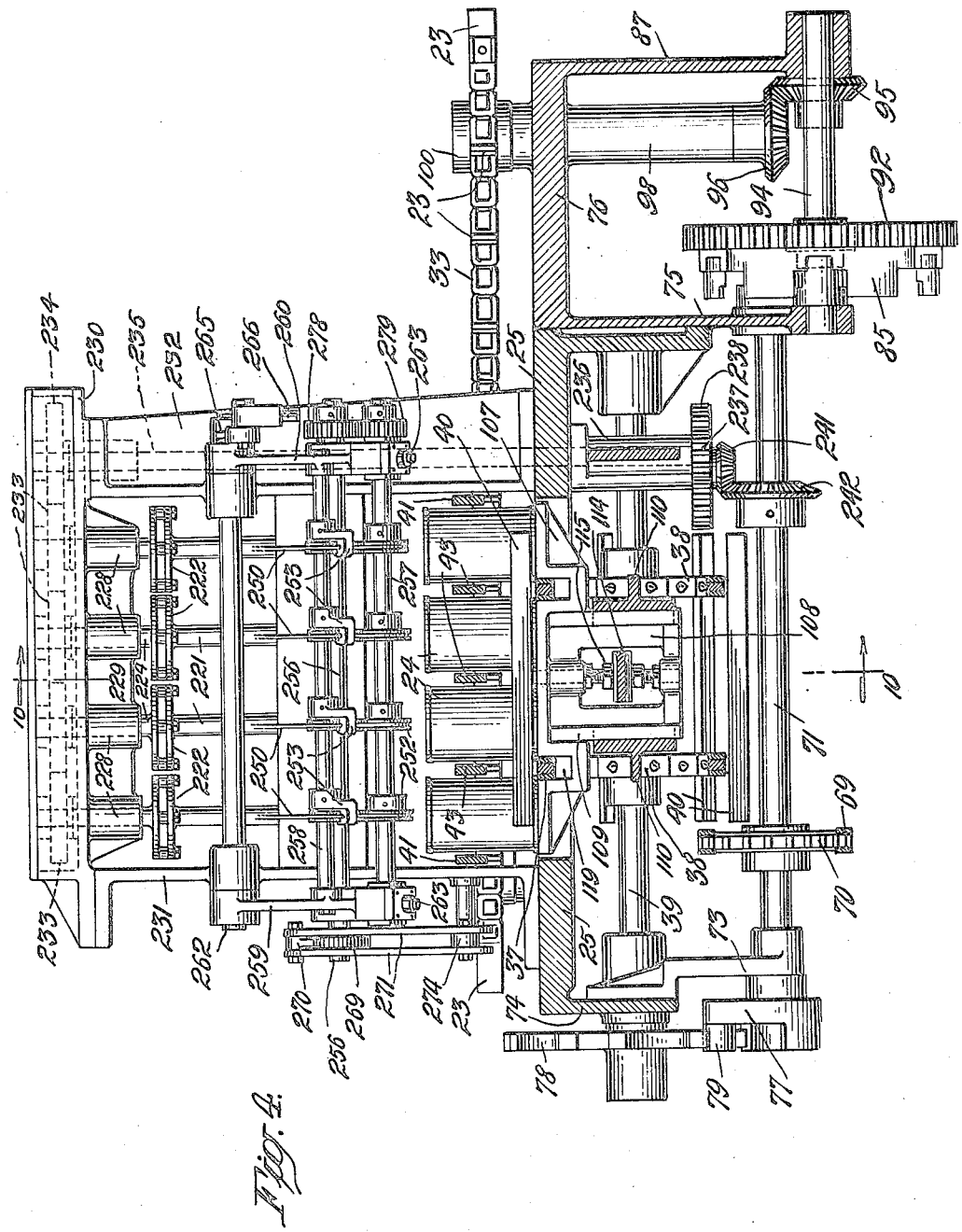
Figure 14:
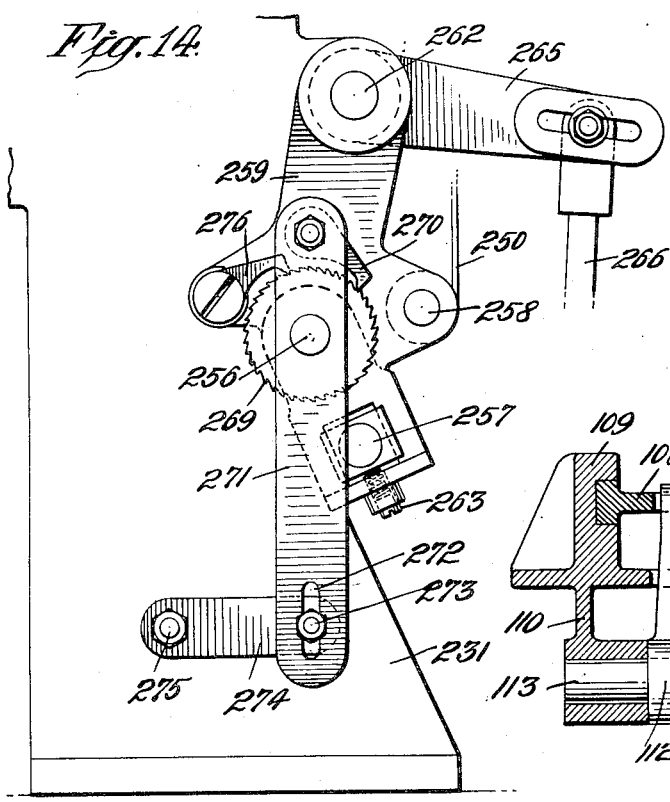
Figure 13:
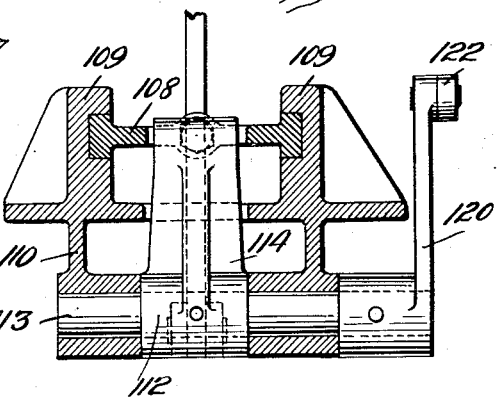
Figure 15:
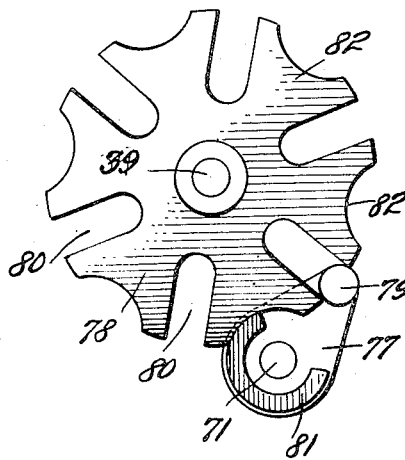
Figure 16:
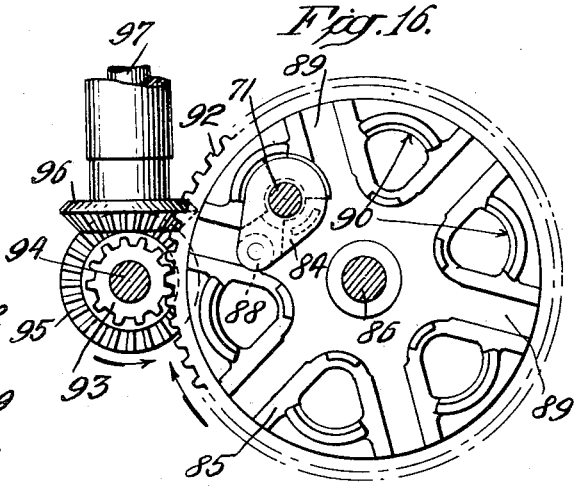

In the accompanying drawings illustrating the preferred form of the invention, Fig. 1 is a vertical, longitudinal section through the improved machine for closing and sealing cans; Fig. 2 is a horizontal section taken on the line 2—2 of Fig. 1, but with the machine in reversed position; Fig. 3 is an enlarged transverse section taken along the line 3—3 of Fig. 1, and looking in the direction of the arrows; Fig. 4 is a transverse section taken on the line 4—4 of Fig. 1; Fig. 5 is an enlarged horizontal section taken on the line 5—5 of Fig. 3; Fig. 6 is a section taken on the line 6—6 of Fig. 5; Fig. 7 is an end elevation of the strip feeding devices shown in Fig. 6; Fig. 8 is an enlarged vertical section taken on the line 8—8 of Fig. 3; Fig. 9 is a top plan of the driving mechanism of the machine seen in the position shown in Fig. 2, with the supporting parts shown in section; Fig. 10 is an enlarged vertical section taken on the line 10—10 of Fig. 4; Fig. 11 is a top plan of the gas burners for heating the soldering irons, and showing in a detail section the burner apertures; Fig. 12 is a top plan of one of the guides for directing the strip solder to the soldering iron; Fig. 13 is a detail section taken on the line 13—13 of Fig. 3; Fig. 14 is an enlarged side elevation of the devices for feeding the solder; Figs. 15 and 16 are, respectively, side elevations of the two Geneva gear movements for securing the intermittent feed of the cans through the machines and the discharge of the sealed cans from the machine; Figs. 17, 18 and 19 are enlarged longitudinal sections of the devices for cutting a disk from the strip of metal and inserting it into the aperture or depression in the top end of a can, and showing the successive various positions of the parts in performing these operations; Fig. 20 is a detail of the lower end of one of the brushes for applying flux; and Fig. 21 is a detail of one of the soldering irons in action.

The improved machine for closing and sealing cans as illustrated in the drawings comprises an elongated table 25 supported by the legs 26. The filled cans 24 to be closed and sealed may be brought to the machine in any preferred manner, as by the conveyor belt 27, which passes over a pulley 32 located under the opening 34 in the table 25. Although any desired number of cans may be operated upon simultaneously, the machine illustrated in the drawings is arranged to operate upon successive batches of four cans each. When a batch of four cans has been moved onto the receiving end of the table 25, which is the left hand end of the machine in Fig. 2, the cans are advanced intermittently along the table to be operated upon by the closing, fluxing and soldering devices.

In the top end 28 of each can, as indicated in Fig. 17, there is a central depression 29 in which is located a central hole or aperture 30 through which the milk or other product has been introduced into the can. When the cans reach the station indicated at A, disks of metal 31 are inserted into the depressions 29, as shown in Figs. 18 and 19, thereby closing the cans. Inserting the disks into the depressions 29 is equivalent to inserting them into the "apertures" of the cans, since the disks close the holes 30. The cans are then advanced along the table until they reach the station indicated at B, where flux is applied to the joint between the disks and the side edges of the depressions, as shown in Fig. 20. After the flux has been applied the cans are advanced to the station indicated at C, where solder is applied to the joint between the disks and the depressions, as shown in Fig. 21. Although actual tests have demonstrated that forcing a disk of metal tightly into a depression 29 in the top end of a can effectively closes the can, it is considered desirable to solder the joint between the disk and the depression. Upon the completion of the soldering operation the batch of sealed cans is advanced into position to be discharged from the machine by the arms 23 of a transversely arranged conveyor 33.

The cans are advanced intermittently along the table 25 for the closing and sealing operations by means of a longitudinally arranged conveyor indicated generally at 35 in Fig. 2. The conveyor 35 consists of two endless chains 37 which travel in longitudinal grooves in the table 25 and pass over driving sprockets 38 mounted on the transversely arranged shaft 39 at the discharge end of the machine and over idler sprockets mounted on the transverse shaft 36 journaled in the receiving end of the machine. Each batch of four cans is held in transverse alinement as it is advanced along the table 25 by means of the cross-pieces 40 secured to the conveyor chains 37 and spaced apart slightly more than the diameter of the cans. The cans are held in longitudinal alinement by means of the two outer guide strips 41 secured to the uprights 42 rising from the table 25, and by means of the three inner guides 43 supported from the cross-pieces 44 resting on the upper ends of the uprights 42. As each batch of four cans is pushed onto the receiving end of the table 25 by the conveyor belt 27 the foremost can encounters the stop 45. The filled cans to be closed and sealed are fed onto the table during the momentary pause of the conveyor 35, and during this pause the cans at the stations A, B and C, respectively, are being subjected simultaneously to the operations performed at these stations, whereas the batch of cans which has just been discharged from station C is being removed from the machine by conveyor 33. The belt 27 operates constantly, whereas the conveyors 35 and 33 operate intermittently but alternately with each other.

Power is transmitted to the machine through the belt 47 which passes over the pulley 48 fixed on one end of a shaft 49 journaled in the bearings 50 formed in the end walls of a housing 51 and in a bearing 52. A beveled gear 53 fixed on the other end of the shaft 49 meshes with a beveled gear 54 mounted on a shaft 55 journaled in a housing 56. On the shaft 55 is mounted a worm 58 which meshes with a worm gear 59 fixed on the shaft 60 on which the pulley 32 is mounted. The conveyor 35 is driven from the shaft 49 by means of a worm 62 which meshes with a worm gear 63 mounted on the shaft 64 within the housing 51. At one end the shaft 64 is journaled in bearings 65 formed in the side walls of the housing 51 and at its other end in a bearing 66 formed on the lower end of a bracket 67 depending from the under side of the table 25. On the shaft 64 is mounted a sprocket wheel 68 over which passes one end of a chain 69 the other end of which passes over a sprocket wheel 70 mounted on a transversely arranged shaft 71 located at the discharge end of the machine. The shaft 71 is journaled at one end in a bracket 73 supported from the downturned part 74 of the table 25, and at its other end in the side wall 75 of a box-like structure 76 secured to one side of the discharge end of the machine. On the front end of the shaft 71 is mounted an arm 77 forming one member of a Geneva gear movement, the other, slotted member 78 of which is mounted on the front end of the shaft 39 on which the sprocket wheels 38 are mounted. The arm 77 carries a roll 79 which enters the radial slots 80 in the member 78 to turn it intermittently and the arcuate part 81 of the arm 77 is adapted to ride in the concave surfaces 82 of the member 78 to hold it stationary between the intervals during which the roll 79 is in engagement with the slots 80.

The conveyor 33 is driven intermittently from the shaft 71: On the rear end of the shaft 71 is mounted an arm 84 which forms one member of a Geneva gear movement, the other, slotted member 85 of which is mounted on a shaft 86 journaled at one end in the wall 75 and at its other end in the wall 87 of the structure 76. The arm 84 carries a roll 88 which is adapted to travel in the slots 89 of the member 85. An arcuate part on the arm 84 cooperates with the concave surfaces 90 of the member 85 to hold the latter stationary between the intervals during which the roll 88 travels through the slots 89. Secured to the Geneva gear member 85 is a gear 92 which meshes with a pinion 93 mounted on a shaft 94 journaled in the walls 75 and 87. On the shaft 94 is mounted a miter gear 95 which meshes with a miter gear 96 fixed on the lower end of a vertically arranged shaft 97 journaled in the bearing 98 depending from the top of the structure 76. On the upper end of the shaft 97 is fixed a sprocket wheel 100 over which passes one end of the conveyor 33, the other end of which passes over the sprocket wheel 101 mounted on an upright stud 102 fixed in the table 25. The Geneva gear movement consisting of the members 77 and 78 and the Geneva gear movement consisting of the members 84 and 85 are so timed in their operation that the member 78 is stationary while the member 85 is turning, and vice versa. Consequently the conveyor 35 is advanced while the conveyor 33 is stationary to receive the cans discharged from station C, and conversely, while the conveyor 35 remains stationary during the operations performed upon the cans the conveyor 33 is actuated to discharge the sealed cans from the machine.

To receive the operations performed at stations A, B and C the cans are lifted out of their normal path of travel along the table 25 and held in a fixed position. For this purpose the table 25 is provided at the stations A, B and C with transversely extending slots 104. In these slots there are located at the stations A, B and C, respectively, the movable supports 105, 106 and 107, a side elevation of one of these supports (107) being best indicated in Fig. 4. Each support has a depending web 108 the outer enlarged edges of which slide in the vertically arranged guides 109 formed in the brackets 110 secured to the under side of the table 25.

The upper surfaces of the supports 105, 106 and 107 are normally flush with the top surface of the table 25 to permit the cans to be moved onto and from the supports without disturbing the orderly travel of the cans along the table. The means for holding the supports in their normal position and for raising them to lift the cans into position for the closing, fluxing and soldering operations comprises the three bell crank levers 112, one for each support, fixed on the pivot pins 113 journaled in the brackets 110. Each bell crank 112 consists of a horizontally arranged arm 114 and a vertically arranged arm 111. The free end of the horizontal arm 114 is engaged between a headed screw 115 adjustably threaded into the upper part of the web 108 and a headed screw 116 adjustably threaded into the lower part of the web 108. The free lower ends of the vertically arranged arms 111 of the bell crank levers 112 are pivotally connected together by a ling 118 so that the bell cranks will all operate in unison to lift and lower the supports 105, 106 and 107 simultaneously. In order not to interfere with the conveyor chains 37 during the lifting of the supports each support is provided with the two vertically arranged recesses 119 which loosely receive the chains 37.

The means for actuating the bell crank levers 112 comprises an arm 120 fixed on the rearwardly projecting end of the first or right hand pivot pin 113. The free end of the arm 120 is pivotally connected by the vertically arranged link 122 with the free end of the arm 123 of a bell crank fixed on the front end of a pivot pin 124 journaled in a boss 121 formed in the lower end of the bracket 67. The other arm 125 of the bell crank carries a roll 126 which travels in the groove 127 of a cam disk 128 mounted on the shaft 64. To counterbalance the load carried by the arms 114 of the bell cranks 112 the rear end of the pivot pin 124 has secured to it a counter-weight 129.

The disks 31 for closing the openings 30 in the top ends of the cans are cut from a strip or ribbon of sheet metal 130 fed over and supported on the dies 131 provided with the central openings 132 in alinement with the depressions 29 of the cans while they are occupying station A. The dies 131 occupy openings in the rectangular blocks 137 secured to the under side of a horizontally extending flange 133 constituting the bottom of the web 134 extending axially of station A and supported at its ends in the uprights 135 and 136 rising from the table 25. The strip of metal 130 is fed intermittently over the dies 131 in timed relation with the intermittent movements of the conveyor 35 so as to present fresh uncut portions of the strip 130 to the action of the dies 131 and of the punches 138 which coperate therewith to cut from the strip the disks 31.

The punches 138 are hollow cylindrical members inserted into the lower ends of the sleeves 139 slidingly mounted in the bushings 140 lining the enlargements or bosses 141 of the web 134. The upper end of each sleeve 139 is adjustably secured by the nuts 143 in the bosses 144 of a cross-head, indicated generally at 145, the outer reduced ends 146 of which slide vertically in the openings 147 formed in the upper ends of the uprights 135 and 136. Extending outwardly from each end 146 of the cross-head 145 is a block 148 which supports a pin 149 on which is pivoted the lower end of an eccentric strap 150 which passes over an eccentric 151 fixed on a shaft 152 journaled in the bearings 153 formed in the cross-piece 154 resting on the upper ends of the uprights 135 and 136. On one end of the shaft 152 is mounted a sprocket wheel 155 over which passes the upper end of a vertically arranged chain 156 the lower end of which passes over a sprocket wheel 158 mounted on the rear end of the shaft 64. Thus the shaft 152 is driven constantly from the shaft 64. Since, however, the punches 138 are actuated by the eccentric straps 150 there is ample opportunity for the lowering of the cans which have just been operated upon, the advance of the conveyor 35 to bring a fresh batch of cans into station A and the lifting of this batch of cans into position to be operated upon, while the punches are rising and descending into position to cut the disks 31 from the strip of metal 130. On the two extremities of the shaft 152 are mounted the balance wheels 147.

The punches 138 operate to cut the disks 31 from the strip of metal and insert them into the mouth of the depressions 29 formed in the tops of the cans, as indicated in Fig. 18. The bottom ends of the punches 138 do not descend below the upper surfaces of the tops 28 of the cans because the diameter of the punches 138 is slightly larger than the internal diameter of the depressions 29. When the punches 138 have acted to insert the disks 30 into the mouths of the depressions 29, the plungers 160, slidingly received within the punches 138, are brought into operation to force the disks 31 deeper into the depressions 29, as shown in Fig. 19. The lower ends or heads 161 of the plungers 160 are substantially smaller in diameter than the disks 31 and engage with the center of the disks so that the act of forcing the disks more deeply into the depressions 29 will result in imparting a convexo-concave form to the disks, with the concave side uppermost. This mode of operation and the reasons therefor are fully set forth in my said application.

The plungers 160 are screwed at their upper ends into the lower ends of the rods 162 slidingly received in the sleeves 139. The upper end of each rod 162 carries a block 163 which is slotted transversely to receive a roll 164 carried by the outer end of a lever arm 165 fixed on a shaft 166 journaled in brackets 167 supported from the cross-head 145. The shaft 166 to which the lever arms 165 are secured is oscillated to impart the vertically reciprocating movements to the rods 162 by means of a single lever arm 168 which extends vertically upwardly from the shaft 166 and is grooved to receive a roll 170 adjustably secured to the lower slotted end of an arm 171 of a bell crank fixed on a shaft 172 journaled at its ends in the cross-piece 154. The other arm 173 of the bell crank carries a roll 174 which travels in the groove 175 of a cam disk 176 fixed on the shaft 152. Since the shaft 166 is mounted on the cross-head 145, the lever arms 168 and 171 are connected by the roll and slot construction which permits relative vertical movement between them while they are oscillating.

The plungers 160 are actuated while the punches 138 remain in their lowermost position and the heads 161 thereof are withdrawn again into the recesses 178, formed in the lower ends of the punches 138, before the punches rise. The punches are then lifted to permit the strip of metal 130 to be fed forward. In order to free the strip of metal from the lower ends of the punches as they are withdrawn upwardly I provide the stripper plates 180 inserted into the lower ends of the bosses 141 with the central holes 181 thereof in alinement with the holes 132 of the dies 131.

The strip or ribbon of metal 130 is fed forward at a slight angle to the line passing through the centers of the dies, as indicated in Fig. 5, and for this purpose the upper surfaces of the blocks 137 are provided with the diagonally extending grooves 182 which constitute the channel through which the strip of metal 130 is advanced over the dies. The means for intermittently feeding forward the strip of metal 130 comprises two sets of knurled rolls, an upper roll 184 and a lower roll 185. Each set of rolls is a duplicate of the other and is constructed and operated in the same way. The set of rolls on the front side of the machine operates to feed the strip of metal into the machine and the set of rolls on the rear side of the machine operates to discharge the punched strip from the machine.

Each upper roll 184 is mounted on a shaft 186 journaled in bearings 187 formed on a bracket 188 depending from a cross web 189 on the outer side of each of the uprights 135 and 136. The lower rolls 185 are mounted on the shafts 191 supported in bearings formed in the lower ends of the brackets 188, and are spring-pressed toward the upper rolls. On the shafts 186 and 191 are the spur gears 192 and 193. On the outer end of each shaft 186 is mounted a beveled gear 195 which meshes with a beveled gear 196 mounted on the lower end of a vertically arranged shaft journaled in a bearing formed in the bracket 197, the upper end of each shaft carrying a beveled gear 198 which meshes with a beveled gear 199 mounted on a shaft 200 extending transversely of the uprights 135 and 136 and journaled in bearings formed on brackets 197. On one end the shaft 200 carries a ratchet wheel 202 adapted to be actuated by a pawl 203 mounted on an arm 204 the lower end of which is bifurcated to straddle the ratchet wheel 202 and is supported on the shaft 200. The outer slotted end of the arm 204 adjustably receives a pin 205 carried by the lower end of a link 206, the upper end of which is fastened in an eccentric strap 207 which passes over an eccentric 208 mounted on one end of the shaft 152. A spring-pressed pawl 209 prevents backward movement of the ratchet wheel 202 after it has been fed forward by the pawl 203.

The flux applying device at station B comprises a series of four alined brushes 211 extending transversely across the table 25, each brush being in alinement with the depression 29 of the can supported beneath it. The brushes 211 are circular and are fixed in the lower ends of the pipes 212 extending downwardly from a flux containing reservoir 213. In each pipe 212 is a control valve 215. The reservoir 213 is a cylindrical tank and is supported at its ends in the uprights 216 and 217 rising from the table 25. Flux is admitted into the reservoir 213 through the plugged hole 218 in the top thereof. The flux applying brushes 213 are located on a fixed horizontal plane of such height above the table 25 that when the support 106 rises with the batch of cans thereon the brushes 211 contact with and apply flux to the joint between the outer edges of the disks 31 and the edges of the depressions 29, as indicated in Fig. 20. The valve 215 in each pipe 212 remains open during the continued operation of the machine and is then shut off.

The soldering devices at station C comprise four alined irons 220 in the shape of short cylindrical bars of slightly less diameter than the diameter of the disks 31, inserted into the lower ends of rods 221. Each iron 220 is in exact alinement with the disk 31 of the can beneath it resting on the support 107. The upper end of each rod 221 is provided with a disk-like flange 222 secured to the corresponding-shaped flange 223 on the lower end of a vertically arranged shaft 224 by means of the bolts 225 and is spaced apart from the disk 223 by the bushings 226 to avoid as much as possible the communication of heat from the flange 222 to the flange 223 and shaft 224. The shafts 224 are journaled in the bosses 228 formed in the web 229 depending from a gear box 230 extending transversely across the machine and supported on the upper ends of the uprights 231 and 232 rising from the table 25. To the upper end of each shaft 224 is secured a spur gear 233. The gears 233 mesh with each other on a horizontal plane. The right hand gear 233, viewing Fig. 4, meshes with a gear 234 mounted on the upper end of a vertically arranged shaft 235 journaled at its upper end in the upright 232 and at its lower end in a bearing 236 secured to the under side of the table 25. On its lower extremity the shaft 235 carries a pinion 237 which meshes with a gear 238 mounted on a shaft 239 journaled in the bearing 236. On the lower end of the shaft 239 is mounted a beveled gear 241 which meshes with and is driven by a beveled gear 242 mounted on the shaft 71. It is thus seen that the soldering irons 220 turn constantly. Heat is applied to the lower ends of the rods 221 just above the soldering irons 220 by means of the circular gas burners 244 mounted in the hollow box-like structure 245 supported at its ends from the uprights 231 and 232. Each burner is provided with a plurality of small apertures 246, as indicated in Figs. 10 and 11. Gas is supplied to the interior of the box 245 through the pipe 247. Each rod 221 is located substantially in the center of its burner 244. A guard 248 is mounted over the burners and is supported by brackets from the uprights 231 and 232.

Associated with each soldering iron 220 is a device for feeding to it a strip of solder 250 which is preferably in thread or ribbon form and is wound on a reel (not shown). Each solder feeding device consists of an upper feed roll 251 and a lower feed roll 252. The feed rolls 251 and 252 are grooved and engage with its strip of solder on opposite sides thereof. The solder is directed between the feed rolls through a guide 253 from a grooved idler roll 254. The solder is directed by the feed rolls through a fixed guide 255 to the soldering iron, as shown in Figs. 10 and 21. The guides 255 are mounted on the transversely extending rod 261 fixed at its ends in the uprights 231 and 232. The upper feed rolls 251 are fixed on a shaft 256 and the lower feed rolls on a shaft 257. The idler rolls are pivoted on a rod 258. The shafts 256 and 257 extend transversely of the machine and are journaled at their outer ends in the arms 259 and 260. The rod 258 is fixed at its ends in the arms 259 and 260. These arms are secured to a transverse shaft 262 journaled in bearings formed in the uprights 231 and 232. The distance between the shafts 256 and 257 can be varied by adjusting the shaft in its bearings by means of the adjustment screws 263. The guides 253 are fixed on the rod 258. The shaft 262 is oscillated to swing the feed rolls 251 and 252 toward and from the fixed guides 255. For this purpose the rear end of the shaft 262 is provided with an arm 265 the outer slotted end of which is connected with the upper end of a link 266, the lower end of which is pivotally connected with an arm 267 secured to the right hand shaft 213, as shown in Fig. 9.

The feed of the solder takes place while the feed rolls 251 and 252 are moving away from the fixed guides 255 and is effected in the following manner: The front end of the shaft 256 extends beyond the arm 259 and on this extension is fixed a ratchet wheel 269 adapted to be turned by a pawl 270 pivotally mounted on the upper ends of two arms 271 fulcrumed on the forward extension of the shaft 256 and which embrace the ratchet wheel loosely between them. The lower ends of the arms 271 are provided with the vertically arranged slots 272 which receive the pin 273 carried by the outer end of an arm 274 straddled by the lower ends of the arms 271 and fixed at 275 to the front side of the upright 231. Pivotally mounted on the arm 259 is a detent pawl 276 which prevents backward rotation of the ratchet wheel 269. The above described construction is such that as the arm 259 is swinging in a counter-clockwise direction, viewing Fig. 14, thereby moving the feed rolls 251 and 252 away from the fixed guides 255, the upper ends of the arms 271 are carried to the right with the shafts 256 and 257 on which the feed rolls are mounted, and at the same time the upper extremities of the arms 271 on which the pawl 270 is pivoted have imparted to them a supplemental motion toward the right caused by the fact that the lower slotted ends of the arms 271 are prevented from moving to the right by means of the pin 273. This supplementary movement of the upper ends of the arms 271 causes the pawl 270 to turn the ratchet wheel 269 through an arc equal to one or more teeth on the ratchet wheel, thereby turning the upper feed rolls 251 in a clockwise direction. On the rear end of the shaft 256 is mounted a spur gear 278 which meshes with a spur gear 279 mounted on the rear end of the shaft 257. Consequently the lower feed rolls 252 are turned in a counter-clockwise direction. While the arms 259 and 260 are swinging toward the left, viewing Fig. 14, the upper ends of the arms 271 travel with the shaft 256 and the upper extremities of the arms 271 are given an additional movement because the slotted lower ends of the arms are held from moving to the left by the pin 273. This additional movement of the upper ends of the arms 271 causes the pawl 270 to ride over one or more teeth of the ratchet wheel 269 while the ratchet wheel is held from turning by the detent pawl 276. As the feed rolls move toward the fixed guides 255 they slide over the solder. The extent of swing of the arms 259 and 260 and therefore the amount of travel of the upper ends of the arms 271 and the amount of feed of the solder are determined by the point at which the upper end of the link 266 is connected with the slotted end of the arm 265.

The operation of the machine is, briefly, as follows: A constant stream of filled cans to be closed and sealed is carried to the machine by the conveyor belt 27. The stop 45 permits only four cans to be delivered onto the table in position to be moved forward by the conveyor 35. When the batch of four cans arrive at station A the support 105 rises and lifts the cans into position to receive in the depressions 29 the disks 31. The punches 138 descend, cut the disks from the strip of metal 130 and insert the disks into the mouths of the depressions. Then the plungers 160 descend and force the disks more deeply into the depressions and in doing so cause them to assume a convexo-concave shape. The plungers are then retracted, and as the punches rise the support 105 is lowered to bring the cans to the level of the table. After this the cans are advanced to station B, where the support 106 lifts them to bring the outer edges of the disks into contact with the circular flux applying brushes 211. On the lowering of the support 106 the cans are moved forward to station C where support 107 lifts them to bring the disks into contact with the lower ends of the rotating soldering irons 220. As the cans are lifted the arms 259 and 260 are swung away from the fixed guides 255 to cause the ratchet wheel 269 to turn the feed rolls 251 and 252 to feed forward a length of solder to the irons 220. The cans are now hermetically sealed. When they descend from the soldering irons they are immediately pushed into position to be engaged and discharged from the machine by the fingers 23 of the conveyor 33.

Having thus described the invention what I claim as new is:—

1. A machine for closing and sealing cans having an aperture in their top ends, comprising, means for supporting the cans in upright position, means for intermittently advancing the cans through the machine, means for supporting a strip of metal, means for cutting disks from the strip of metal and inserting them into the apertures in the cans, means for applying flux to the joints between the disks and the apertures, and means for soldering the joints between the disks and the apertures.

2. A machine for closing and sealing cans having an aperture in their top ends, comprising, means for cutting disks from a strip of metal, means for applying flux, soldering means, and means for presenting the cans successively to receive disks in the apertures, flux at the joint between the disks and the apertures, and solder in the joints between the disks and the apertures.

3. A machine for closing and sealing cans having an aperture in their top ends, comprising, an elongated table, means for intermittently advancing cans along the table, means for cutting disks from a strip of metal and inserting them into the apertures, means for applying flux to the joint between the disks and the apertures, and means for soldering the joint between the disks and the apertures.

4. A machine for closing and sealing cans having an aperture in their top ends, comprising, an elongated table, means for intermittently advancing alined cans along the table, means for cutting disks from a strip of metal, flux applying means, soldering means, a movable support for lifting the cans to receive the disks in the apertures, a movable support for lifting the cans to present the edges of the disks and the apertures to the flux applying means, and a movable support for lifting the cans to present the disks to the soldering means.

5. A machine for closing and sealing cans having an aperture in their top ends, comprising, an elongated table having three transversely extending openings, means located above the first opening for cutting disks from a strip of metal, means located above the second opening for applying flux, soldering means located above the third opening, a movable support located in each opening, means for intermittently advancing successive batches of cans onto the supports, and means for lifting the supports and the cans thereon to receive the disks in the apertures, to present the joint between the disks and the apertures to the flux applying means and to present the disks to the soldering means.

6. A machine for closing and sealing cans having an aperture in their top ends, comprising, means for intermittently advancing the cans through the machine, means for supporting a strip of metal, means for cutting disks from the strip of metal and inserting them into the apertures of the cans, and means for soldering the joints between the disks and the apertures.

7. A machine for closing and sealing cans comprising, an elongated table having three transverse openings therein, a vertically movable support located in each opening the upper surface of which is normally flush with the table, means for cutting a series of disks from a sheet of metal located over the first opening, flux applying means consisting of a plurality of alined brushes located over the second opening, soldering means consisting of a plurality of alined soldering irons located over the third opening, means for advancing successive batches of cans along the table intermittently, each can having a central aperture in its top end, said batches of cans pausing successively over the supports, means for actuating the supports simultaneously to lift the cans thereon, the cans on the first support receiving the disks in their apertures, the cans on the second support having flux applied to the joints between the disks and the apertures, and the cans on the third support having solder applied to the joints between the disks and the apertures, and means operating alternately with the means for advancing the cans along the table for removing the sealed cans from the machine.

JOHN M. McCLATCHIE.